United States Patent [19]
Stanton

[11] Patent Number: 5,005,525
[45] Date of Patent: Apr. 9, 1991

[54] ANIMAL MARKING AND URINATION CONTROL DEVICE

[76] Inventor: Dorothy R. Stanton, 8721 32nd Circle North, New Hope, Minn. 55427

[21] Appl. No.: 374,734

[22] Filed: Jul. 3, 1989

[51] Int. Cl.⁵ ............................................. A01K 23/00
[52] U.S. Cl. ........................................ 119/95; 119/143
[58] Field of Search ................................. 119/95, 143

[56] References Cited

U.S. PATENT DOCUMENTS

| | | | |
|---|---|---|---|
| 900,783 | 10/1908 | Roberts | 119/95 |
| 2,539,606 | 1/1951 | Bailey | 119/143 |
| 2,974,635 | 3/1961 | McDowell | 119/143 |
| 3,101,696 | 8/1963 | Lipman | 119/143 |
| 3,141,443 | 7/1964 | Huey | 119/143 |
| 3,738,330 | 6/1973 | Alofsin | 119/143 |
| 3,817,217 | 6/1974 | Matuka et al. | 119/95 |
| 4,290,386 | 9/1981 | Eiricksson | 119/95 |
| 4,444,152 | 4/1984 | Berardo | 119/95 |

Primary Examiner—Paul J. Hirsch
Attorney, Agent, or Firm—Sten E. Hakanson

[57] ABSTRACT

The control device of the present invention includes a body panel having a top surface with a pouch area located centrally thereof for releasably retaining a disposable absorbent pad. The body panel is formed to include a pair of waist flange areas at the distal end thereof and toward its proximal end tapers a narrowed portion that lies just ahead of a pair of proximal end flanges. A pair of adjustable rib cage straps are secured to the proximal end flanges, and a pair of adjustable waist straps are secured to each of the waist flanges. Each strap pair includes cooperating releasable securing means on the ends thereof. In operation, the body panel is located beneath the animal. Specifically, the top surface thereof is placed against the animal and is held there by securing of the rib cage straps around the chest of the animal just ahead of the distal end of its rib cage and by securing of the waist straps around the waist area of the animal just ahead of its hind quarters. The panel is sized in proper proportion to the animal, and the absorbant pad is positioned thereon immediately beneath the genital area of the animal, so that any urine excreted by the animal is absorbed by the pad.

8 Claims, 1 Drawing Sheet

ANIMAL MARKING AND URINATION CONTROL DEVICE

BACKGROUND

1. Field of the Invention

The present invention relates to devices for preventing unwanted scent marking or urination by an animal, and in particular to such devices used with household pets.

2. Background of the Invention.

It is well known by pet owners, especially of male dogs and cats' that such pets will instinctively "mark" their territory. This is accomplished by the animal's depositing of a small amount of urine generally containing a particularly strong smelling glandular secretion that, in the wild, is useful as a means of territorial demarcation. However, such marking activity is not desirable in a household pet, especially if it occurs indoors. Unfortunately, short of leaving the pet outside at all times, their is no way of preventing this territorial marking as the result of training alone, due to the basic instinctive nature of the behavior.

A diaper-like device is known in the prior art, for use primarily with female dogs when they are in heat, and is worn by the animal around its hind quarters to interfere with mating. However, such devices have no utility for the prevention of marking secretion by a male animal. In addition, it is well understood that animals can be very intolerant of various devices or clothing like articles secured to them.

It would therefore be very desirable to have a device that prevented the damage that can result from this marking activity, and to do so with a device that is well tolerated and comfortable to the animal, and that is easy and inexpensive to use.

SUMMARY OF THE INVENTION

The objects and advantages of the present invention include, but are not limited to the following:

1. To provide for a device that prevents unwanted animal scent marking.
2. To provide for such a device that will be well tolerated by the animal.
3. To provide for such a device that is easy and inexpensive to use.

The control device of the present invention includes a body panel having a top surface with a pouch area located centrally thereof for releasably retaining a disposable absorbant pad. The body panel is formed to include a pair of waist flange areas at the distal end thereof and towards its proximal end tapers to a narrowed portion that lies just ahead of a pair of proximal end flanges. A pair of adjustable rib cage straps are secured to the proximal end flanges, and a pair of adjustable waist straps are secured to each of the waist flanges. Each strap pair includes cooperating releasable securing means on the ends thereof.

In operation, the body panel is located beneath the animal. Specifically, the top surface thereof is placed against the animal and is held there by securing of the rib cage straps around the chest of the animal just ahead of the distal end of its rib cage and by securing of the waist straps around the waist area of the animal just ahead of its hind quarters. The panel is sized in proper proportion to the animal, and the absorbant pad is positioned thereon immediately beneath the genital area of the animal, so that any urine excreted by the animal is absorbed by the pad.

It can be appreciated by those of skill that the particular positioning of the straps serves to better retain the invention herein on the animal. Also, the tapering of the panel allows for conforming thereof to the normal body contour of a four legged animal so that the surface area of the panel remains closely adjacent the animal's body for providing for a snug fitting device that is less prone to removal or tearing. In addition, the close fitting assures that the pad remains immediately adjacent the animal so that any urine is directly absorbed thereby.

The present invention was found to be very well tolerated by animals and not to result in attempts by the animal to remove it. In addition, it was found that the present invention reduced the tendency for the animal to initiate or engage in marking activity. It was also discovered that the invention herein can be used successfully as a birth control device for a male animal, in that it mechanically prevents mating. Moreover, the present invention has utility for use with female animals after a surgical sterilization of the animal wherein the pad provides support for and prevents infection of the incisions made in the lower abdominal area.

DESCRIPTION OF THE DRAWINGS

A further understanding of the structure, operation, objects and advantages of the present invention can be had in view of the following detailed description which refers to the following figures, wherein.

DETAILED DESCRIPTION OF THE PREFERRED EMBODIMENT

Figure 1:
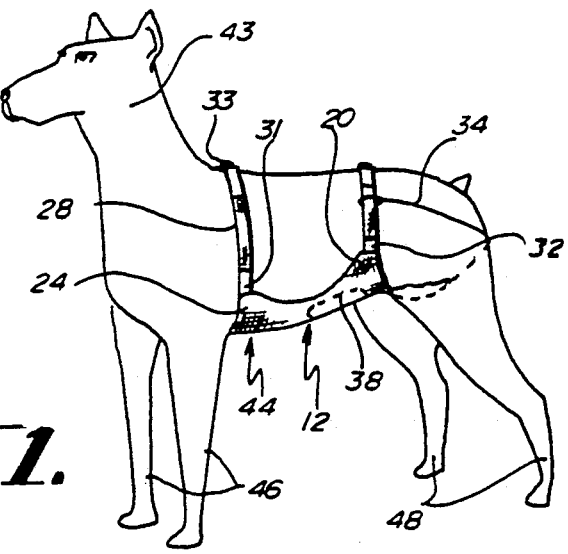
FIG. 1 shows an environmental view of the present invention as secured to an animal.

Referring to the various figures, the marking control device of the present invention is referred to generally by the number 10. Device 10 includes a panel 12 consisting of a flexible material such as leather or vinyl. Panel 12 includes two layers 14 and 16, defining top and bottom surfaces 14a and 16a respectively. Panel 10 is formed by the folding of a single piece of material at one end thereof forming a loop 18 whereby layers 14 and 16 are sewn together around the perimeter thereof with the stitching represented by the dashed lines 19. Panel 12 includes a pair of waist flange portions 20 and a pair of chest flange portions 24 and a narrowed area 26 there between. A chest strap 28 extends through loop end 29, and a pair of waist straps 30 are secured to each of the flanges 20. Attachment strap 28 extends through loop end 29, and includes an elastic segment 31. Segment S1 extends through loop end 29 and is slidably engaged therein. Each waist strap 30 also includes an elastic segment 32. Straps 28 and 30 also have cooperating releasable attachment portions 33 secured to the ends thereof. Portions 33 are made from material such as Velcro ® that, as is known in the art, allows for cooperative releasable securing. A supplemental attachment cord 34 extends through loop end 18, and panel 12 includes two hind leg cut-out perimeter portions 36.

Figure 2:
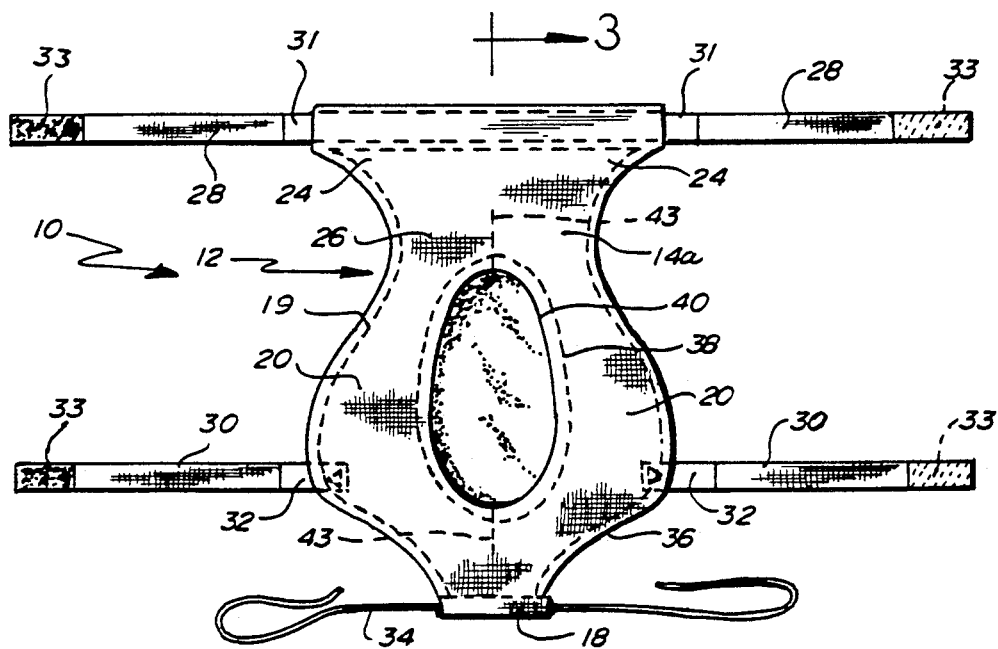
FIG. 2 shows a top plan view of the present invention.
Figure 3:
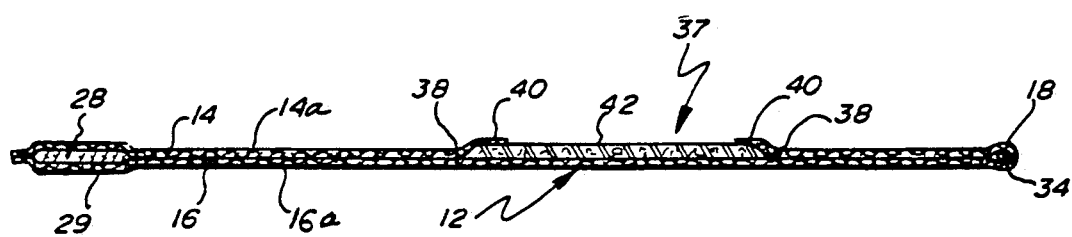
FIG. 3 shows a cross sectional view along lines 3—3 of FIG. 2.

A portion of layer 14 is cut out to define a pouch opening S7. Layer 14 is sewn to layer 16 around a perimeter indicated by dashed line 38, as seen in FIG. 2, thereby defining a retaining lip 40. As seen in FIG. 3, lip 40 provides for removable retaining of an absorbent pad 42. A pair of darts are optionally sewn into top panel layer 14 in the position as indicated by dashed lines 43.

In operation of device 10, a fresh absorbant pad 42 is inserted into pouch opening 37 and is retained therein by the perimeter of the pad being secured between lip 40 and bottom layer 16, after which the invention herein is secured to the animal. Specifically, as seen in FIG. 1, straps 28 and 30 are wrapped around the animal 43 and secured together by contact of their cooperating securing pads 33. As a result thereof, top layer 14 lies closely adjacent the animal's ventral side extending generally from its chest to its genital area. Pad 42 is positioned on panel 12 so that it is positioned immediately below and substantially centrally of the animal's genital region so that it will absorb any urine that results from marking activity or is otherwise excreted. Pad 42 can then be replaced periodically as necessary. Pad 42 is preferably sized to retain approximately 5 ounces of liquid which amount corresponds to the volume of a normal urination of a dog weighing in the range of 25 to 40 pounds. Such absorption capacity is well in excess of the relatively small volume discharges associated with marking activity, which, even in a relatively large breed dog, is typically an ounce or less. Therefore, such absorption capacity is generally sufficient for several marking discharges before removal and replacement of the pad is necessary. Of course, the present invention has utility with respect to the absorption of a normal urination volume particularly if the pad and associated retaining means are increased in surface are and/or thickness to permit such additional absorption. Panel 12 is preferably made of a water resistant material, such as a vinyl or Naugahyde, so that it can be washed, and in veterinary applications, sterilized. Pad 42 can consist of a wide variety of absorbant materials suitable for the absorption of liquids. It has also been found that the present invention can be used to bandage an area on the animal corresponding to that of the pouch. For example, the incisions made on a female dog during a sterilization or spaying procedure require bandaging within such an area. In the normal situation the bandages are taped directly to the animal which can result in skin irritation causing the animal to attempt the removal thereof by chewing at the bandages. As a result of the chewing the animal often further irritates the skin causing an increased potential for infection. By placing bandaging material in the pouch of the invention heroin of sufficient quantity, such can be held firmly in place in the proper position against the incision thereby greatly reducing the irritation associated with adhesive bandages, and thus, the potential for infection that can result there from.

It can be appreciated that elastic portions 31 and 32 provide for a snug fitting of device 10 to the animal and for some adjustability and, in the case of strap portion 31, allow for chest expansion so that the animal can breathe comfortably and also permit secure attachment. Those of skill will understand that panel 10 can be sized to provide for the proper positioning of pad 42, straps 28 and 80, and the perimeter contouring thereof to accommodate the particular species and size of animal. Specifically, it is important that the chest strap 28 extend around the animal proximally of the sternum chest point 44, as seen in FIG. 1. It will be appreciated by those of skill that the lowermost point on the chest of a four legged animal is generally in the region of the sternum wherein the torso thereof tapers upwardly in both the distal direction towards the head and in the proximal direction towards the animal's posterior. Thus, the sternum resists movement of the straps in a posterior direction when in place as indicated. Moreover, movement in the proximal direction is prevented by the animals front legs 46. As a result thereof, device 10 is securely retained on the animal. Also, it can be understood that the panel edge portions 36 must be sufficiently relieved to allow for free movement of the animal's hind legs 48. It will be appreciated by those of skill that darts 48 provide for a gathering of the material of panel 12 causing a slight taking in or cupping thereof to provide for better fitting of panel 12 to the torso particularly of a large chested animal. Also, it can be understood that the use of flanges 20 and 24 serve to create a contour of panel 12 wherein it includes a narrowed area 26 whereby the perimeter edge of panel 12 conforms with and follows closely the ventral side of the animal as the torso narrows from its proximal to distal end. This close fitting reduces any flaps or pulling away of panel from the animals body that could allow the animal a means for grabbing or otherwise attempting removal of the present invention.

Cord 34 can optionally be used as further securing of panel 10 by first extending the ends of cord 34 between the animal's hind legs 48 and then there around on each side of the tail 50, and then securing each end to waist straps 30, as is illustrated in FIG. 1. Cord 34 provides for additional securing of the present invention to the animal, which securing can be of value on a particularly physically active pet.

The present invention has been described herein as including various specific structures. However, it will be apparent to those of skill that various modifications or rearrangements of the described structure can be made without departing from the spirit and scope of the underlying inventive concept thereof. Therefore, the present invention is not limited to the particular form shown and described herein, reference being directed to the appended claims for a determination of the scope thereof.

What is claimed is:

1. A device for securing along the ventral side of a four legged animal in the region extending substantially from the area of the sternum distally to the area of the genitals of the animal, for preventing marking activity, and the like, comprising: a flexible body panel, the panel having a chest end and a waist end opposite therefrom, the chest end having a pair of chest end flanges extending therefrom and the waist end having a pair of waist end flanges extending therefrom defining a narrowed area there between, and the panel having pouch means for releasable retaining of absorbant pad means therein, a pair of chest straps, each strap having a first end secured to one of the chest end flanges and extending therefrom to a second end, the chest strap second ends having cooperating releasable securing means thereon and the panel proportioned with respect to the animal so that the chest straps extend around the torso of the animal between the front legs and the sternum thereof and the securing means for providing releasable securing together of the chest straps and the chest straps extending around the animal between the front legs and the sternum thereof for providing secure holding of the panel chest end to the animal, a pair of waist straps each strap having a first end secured to one of the waist end flanges and extending therefrom to a second end, the waist strap second ends having cooperating releasable securing means thereon and the waist straps extending around and releasably securing to the torso of the animal and the panel proportioned with respect to the animal so that the waist straps extend around the torso of the animal proximally of the hind legs thereof for providing releasable securing of the panel closely adjacent the animal genital area and the pouch positioned on the panel so that the pad means lies adjacent the genital area of the animal for absorbing any urine excreted by the animal, and the chest and waist flanges and the narrowed area creating a panel perimeter edge contour for providing close fitting of the panel to the torso of the animal.

2. The device as defined in claim 1, and at least one chest strap including an elastic portion.

3. The device as defined in claim 2, and at least one waist strap including an elastic portion.

4. The device as defined in claim 1, and the panel waist end having a pair of cord securing means attached thereto for extending therefrom between and around the animal's hind legs for releasable attachment to the waist end straps for providing additional securing of the panel to the animal.

5. The device as defined in claim 1, and the panel waist end having a loop portion for slidably and releasably engaging a cord and the cord extending through the loop and having first and second cord ends the cord ends extending from the loop portion between and around the rear legs of the animal for releasable securing with the waist straps.

6. A device for securing along the ventral side of a four legged animal in the region extending substantially from the area of the sternum distally to the area of the genitals of the animals, for preventing marking activity, and the like, comprising: a flexible body panel, the panel having a chest end and a waist end opposite therefrom, the chest end having a pair of chest end flanges extending therefrom and the waist end having a pair of waist end flanges extending therefrom defining a narrowed area there between, and the panel having pouch means for releasable retaining of absorbant pad means therein, a pair of chest straps, each strap having a first end secured to one of the chest end flanges and extending therefrom to a second end, the chest strap second ends having cooperating releasable securing means thereon and at least one chest strap having an elastic portion and the chest straps extending around the torso of the animal and the panel proportioned with respect to the animal so that the chest straps extend around the animal between the front legs and the sternum thereof and the securing means for providing releasable securing together of the chest straps and the chest straps extending around the animal between the front legs and the sternum thereof for providing secure holding of the panel to the animal, a pair of waist straps each strap having a first end secured to one of the waist end flanges and extending therefrom to a second end, the waist strap second ends having cooperating releasably securing means thereon and at least one waist strap having an elastic portion and the waist straps extending around the torso of the animal and the panel proportioned with respect to the animal so that the waist straps extend around the animal proximally of the hind legs thereof for providing releasable securing of the panel closely adjacent the animal genital area and the pouch positioned on the panel so that the pad means lies adjacent the genital area of the animal for absorbing any urine excreted by the animal and the chest and waist flanges and the narrowed area creating a panel perimeter edge contour for providing close fitting of the panel to the torso of the animal and the elastic portions providing for snug and adjustable securing of the panel to the animal and for facilitating breathing by the animal.

7. The device as defined in claim 6, and the panel waist end having a pair of cord securing means attached thereto for extending therefrom between and around the animal's hind legs for attachment to the waist end straps for providing additional securing of the panel to the animal.

8. The device as defined in claim 6, and the panel waist end having a loop portion for slidably and releasably engaging a cord and the cord extending through the loop and having first and second cord ends the cord ends extending from the loop portion between and around the rear legs of the animal for releasable securing with the waist straps.

* * * * *